Aug. 4, 1936.    A. RONNING    2,049,624
HOSE GASKET MAKING DEVICE
Filed April 9, 1936
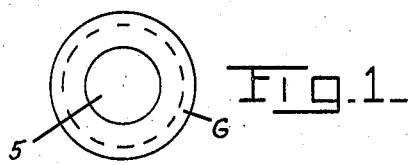
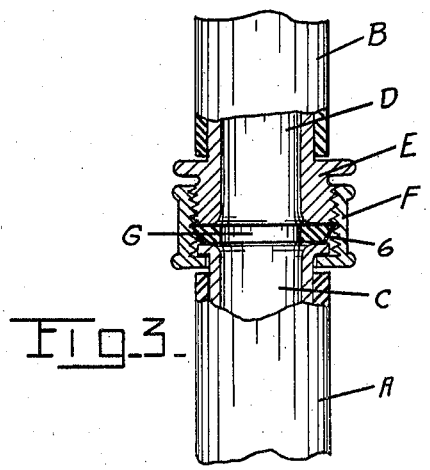
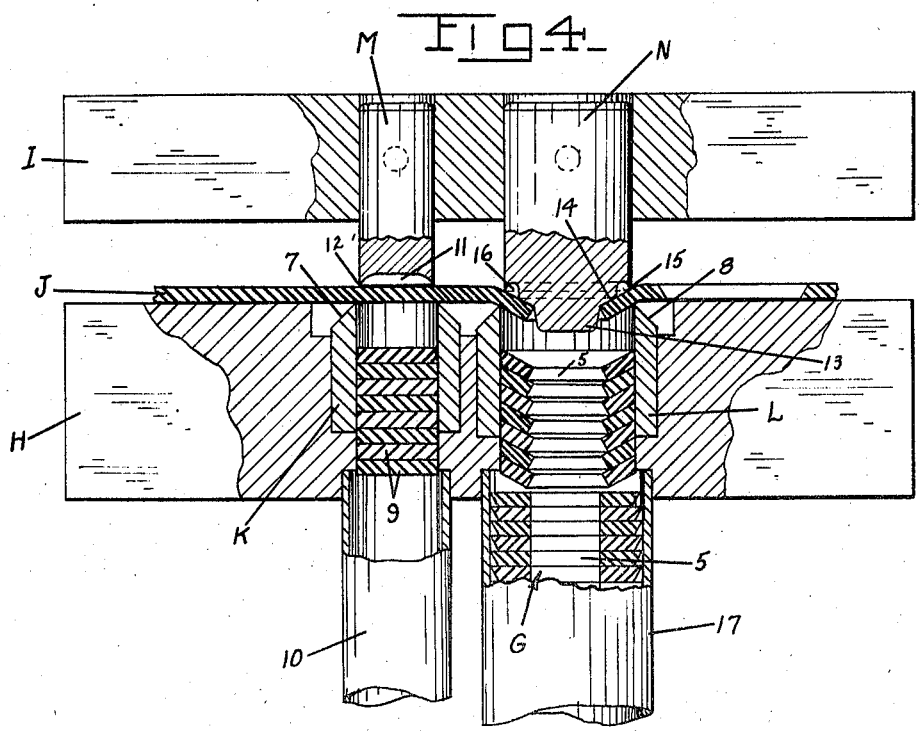
INVENTOR
Adolph Ronning
BY
Andrew E. Carlsen
ATTORNEY Patented Aug. 4, 1936

2,049,624

UNITED STATES PATENT OFFICE 2,049,624

HOSE GASKET MAKING DEVICE

Adolph Ronning, Minneapolis, Minn.

Application April 9, 1936, Serial No. 73,469

3 Claims. (Cl. 164—86)

This invention relates to gaskets or washers for use in couplings of hoses, such as garden hoses, and the primary object is to provide a gasket that is so formed that it may easily and quickly be inserted in the outer coupling and which will be retained therein, even when partially reduced in diameter by shrinkage, thus preventing displacement and loss, and the resulting inconvenience thereof. A further object is to provide a novel, efficient, and practical method or process of manufacturing such gaskets, which method or process will permit of high speed and low cost production of the devices. A further object is to provide an improved mechanism for carrying out the manufacturing process. These and other more detailed and specific objects will be disclosed in the course of the following specification, reference being had to the accompanying drawing, wherein:

Fig. 1 is a plan view of my improved gasket.

Fig. 2 is a diametrical sectional elevation of the gasket.

Fig. 3 is a diametrical section through a conventional type of hose coupling showing my improved gasket in place therein.

Fig. 4 is an elevation principally in section, showing the die mechanism which is arranged to carry out my improved method of gasket manufacture.

Referring to the drawing more particularly and by reference characters, A and B designate a pair of hose ends that are detachably connected by a coupling device, including thimbles C and D which are secured in the respective hose members A and B. The thimble D terminates in an externally threaded plug E, adapted to externally receive an internally threaded cup or sleeve F. This sleeve is free to rotate on the thimble C, and when screwed onto the plug E forms the releasable connection between the two hose members.

To prevent leakage from the coupling member it is necessary to seal the plug E with respect to the thimble C, and this is customarily done by a plane, circular washer which is slipped into the sleeve F before the parts are attached together. Such washers are frequently made of a size that will cause them, when new, to frictionally engage the threads of coupling member F so as to prevent accidental displacement and loss of the washer. It is found, however, that after a washer or gasket has been in use for a short time, it has a tendency to shrink radially, and when this occurs it becomes easily displaced when the coupling is opened and therefore is easily lost. In the present instance I provide a gasket G which is of circular form, and has the necessary center opening 5, but the outer edge of the gasket is beveled as at 6. This bevel not only facilitates placing the gasket in the sleeve F, as the taper is in such a direction that it will move more easily inwardly against the threads than outwardly; and under such circumstances the extreme outer diameter of the washer may be made somewhat larger than would otherwise be the case.

It will now be seen that when the washer G is in place, as indicated in Fig. 3, considerable allowance may be made for shrinkage, while still causing the outer or sharper edge of the washer to engage the internal threads of member F, thereby greatly overcoming the tendency towards displacement under shrinkage conditions.

Washers or gaskets of this type must obviously be manufactured very economically, as they must be sold at a very low price; and with this in mind I have perfected a method of manufacture which will not only produce a gasket having the necessary beveled outer edge 6, but which can be made with such an edge at practically the same cost as the conventional type of washer. To this end I have designed a die mechanism as shown in Fig. 4, including a lower die block H and an upper die block I, which blocks are moved vertically with respect to each other, and preferably the upper die only is moved, while the lower die is made stationary in the machine.

A strip of gasket material J is fed through between the die members by any suitably controlled feed mechanism, and is formed of rubber, fabric, or a combination of rubber and fabric found most suitable for gasket purposes. In any event the material must be resilient so that the gasket can properly function as such when squeezed between coupling members such as C and E.

The lower die unit includes a pair of hardened cutting sleeves K and L, both of which are provided with inwardly beveled cutting edges 7 and 8, respectively, at their upper ends. The sleeve or cylinder K cooperates with an upper piston-like cutting plug M to cut the core or center part out of a gasket when the upper die member moves downwardly. These removed cores are indicated at 9, and are removed from the machine through a tube 10 by which they may be conveyed to a remote point, and may of course be utilized for various purposes.

The cutting plunger M preferably has its lower end recessed as at 11 so as to better define the cutting or punching edge 12. A second cutting plug or piston N is also rigidly secured in the die member I, and cooperates with the cutting cylinder L to cut the previously cored gasket from the strip J, it being understood that the strip J moves intermittently to the right, as shown in Fig. 4. The member N is provided at its lower extremity with an axial hub or boss 13, which engages in the center opening 5 of the gasket to properly center it with respect to the cylinder L. Immediately adjacent to the boss 13 the die piston N is provided with an angular or tapered shoulder 14, which engages the gasket strip immediately outwardly of the hole 5 so as to depress the strip material in the manner shown in Fig. 4 in advance of the secondary cutting step. With the dies in the position as shown, the shoulder 14 holds the gasket material in the trunco-conical form indicated until the outer cutting edge 15 of the core N engages the strip and cooperates with the cutting edge 8 of the cylinder L to annularly cut or punch the washer proper from the gasket material strip. The core N is preferably provided immediately adjacent to and inwardly of the edge 15, with an annular recess 16, to provide suitable clearance during the cutting stroke.

As the ring shaped gaskets or washers are thus completely severed from the strip J, they are pushed down into the cylinder L which is of such a diameter as to constrict the washers and hold them in the trunco-conical or dish-shaped formation in which they are cut.

As successive washers are cut and forced downwardly, however, the column of completed washers held within the cylinder L move down into the delivery tube 17 which is of slightly larger internal diameter, however, so that the gaskets may spread out into their normal or flat positions, as shown. As the gaskets accumulate in the delivery tube 17 they are pushed through the tube, and may thus be conveyed to a wrapping or packaging machine where they may be automatically placed in boxes or other wrappers and made ready for commercial sale and use.

It is of course understood that any suitable die or stamping machine may be used in manipulating the die mechanism, and the strip J is fed through between the dies in any suitable manner, but preferably by a feed mechanism which is synchronized with the die movement so that the strip will be intermittently advanced each time the upper die is raised. Thus, while the cutting piston M is operating in conjunction with the cylinder K to cut the core from the gasket, the cutting piston N is operating to sever the preceding gasket from the strip J.

It is further understood that suitable modifications may be made in the gasket proper, or in the method or means of manufacture as herein disclosed, providing such modifications come within the spirit and scope of the appended claims. Having now therefore fully illustrated and described my invention, what I claim to be new and desire to protect by Letters Patent is:

1. A device for manufacture of resilient washers comprising a pair of dies, reciprocal with respect to each other and between which a strip of blank washer material is intermittently passed, said dies having cooperating primary cutting devices for removing the washer cores, and having secondary cutting devices for severing the cored washers from the blank strip, one of said secondary cutting devices having an axial extension for centering engagement in the core openings of the washers.

2. A device for manufacture of resilient washers comprising a pair of dies, reciprocal with respect to each other and between which a strip of blank washer material is intermittently passed, said dies having cooperating primary cutting devices for removing the washer cores, and having secondary cutting devices for severing the cored washers from the blank strip, said secondary cutting devices having guide means engageable in the cored washer openings.

3. A device for manufacture of resilient washers comprising a pair of dies, reciprocal with respect to each other and between which a strip of blank washer material is intermittently passed, said dies having cooperating primary cutting devices for removing the washer cores, and having secondary cutting devices for severing the cored washers from the blank strip, and means cooperating with the secondary cutting devices for engaging in the washer holes to center the washer blank and for concavely distorting the washer blank while the washer proper is being severed therefrom.

ADOLPH RONNING.